May 18, 1926.
H. G. SPARKS
WINDSHIELD CLEANER
Filed March 4, 1922
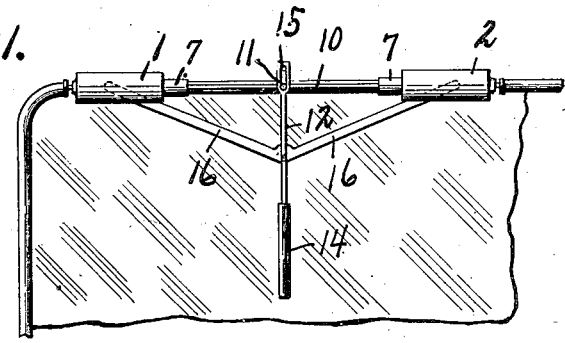
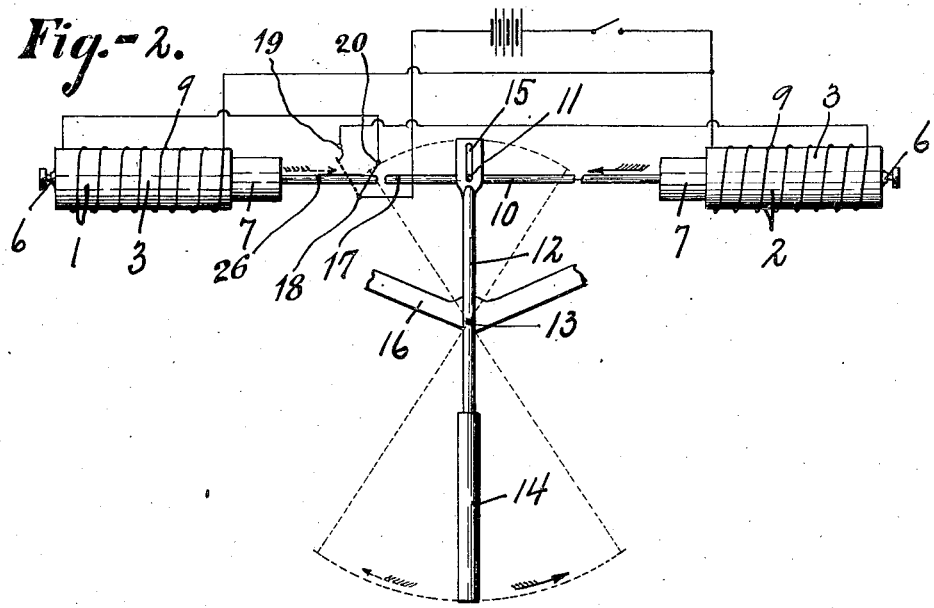
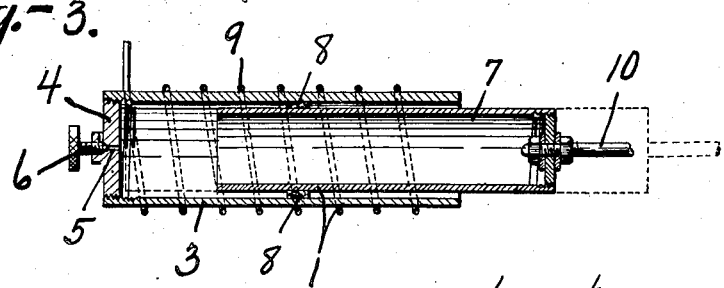
Inventor
Harry G. Sparks
By
Attorneys.

Patented May 18, 1926.

1,584,821

UNITED STATES PATENT OFFICE.

HARRY G. SPARKS, OF JACKSON, MICHIGAN.

WINDSHIELD CLEANER.

Application filed March 4, 1922. Serial No. 541,051.

This invention relates to a certain new and useful windshield cleaner.

The object of the invention is to provide an efficient and automatic device for maintaining a portion of the windshield or similar structure clear of rain, snow, or other vision-obstructing material.

Other objects and advantages relate to the details of construction of the device, all as will more fully appear from the following description, taken in connection with the accompanying drawings in which:—

Figure 1 is an elevation of the device applied to a windshield.

Figure 2 is an elevation of the device separate from the windshield illustrating diagrammatically an operable form of electrical connection.

Figure 3 is a sectional view through one of the solenoids.

The invention, as shown, comprises a pair of solenoids, —1— and —2—, which may be of any suitable and well known form, altho the form shown may perhaps be deemed for the purpose of this invention at present preferred. As shown, each solenoid comprises an outer metallic tube —3— closed at one end by a cast iron cap or plug —4— provided with an air outlet or opening —5— controlled by a valve —6— which may, as shown have a threaded relation with the cap —4—.

Within the cylinder —3— is arranged an armature in the form of a second tube or cylinder —7— of somewhat less diameter than the cylinder —3— and slidable therein, and the cylinder —7—, may, as shown, be surrounded with a ring-like member —8— which forms a substantially air-tight joint between the cylinders so that when the interior cylinder —7— is moved endwise the air pressure in the cylinder —3—, (altho the air is capable of escaping slowly thru the outlet opening —5—) constitutes an air cushion which prevents any shock to the device.

The solenoid wiring —9— may, as shown, surround the outer tube —3—, or may be arranged in any suitable manner for energizing the device. The cylinders —7— of the two solenoids may, as shown, be connected by a piston rod or bar —10— formed near its central point with a pin or other connection —11— for engagement with one end of a wiper lever —12— pivoted at —13— and carrying on its opposite end a wiping member —14—. The wiper lever —12— may, as shown, be formed with a vertically elongated slot —15— in which the pin —11— moves as the piston rod —10— is shifted endwise in opposite directions and alternately by the solenoids. The pivot —13— may be formed upon any stationary part and preferably is mounted upon a V-shaped member —16— which is deflected downwardly at its central portion, while its opposite end is secured to the solenoid cylinders —3— so as to constitute the device a substantially unitary structure.

The wiping member —14— moves about the pivot —13— as a fulcrum to wipe the adjacent portions of the windshield, as the piston rod —10— is shifted endwise in opposite directions. The energizing of the solenoids alternately may be effected in any suitable way and by any suitable electrical connection, many of which will be obvious to those skilled in the art, and purely as illustrative of one construction, satisfactory and capable of use, the piston rod —10— as shown, is formed with two pins or knobs —26— and —17— which in their endwise movement contact with a switch member —18— which may be a spring held in both of its operative positions, and these knobs serve to alternately move the switch —18— into contact with the terminal —19— and the terminal —20— dependent upon the direction of movement and the position of rod —10— so that when one solenoid has been energized and moved, the piston rod endwise in its direction, the current to that solenoid will be cut off by movement of the switch member and the other solenoid will be energized by current flowing in its circuit which is closed by movement of switch —18—, to thereby effect endwise movement of the piston rod —10— in the opposite direction and thereby alternately shifting the wiping lever —12— in opposite directions about its pivotal axis —13— to move the wiping member —14— across the adjacent portion of the windshield and thereby remove foreign matter from the shield.

The solenoids —1— and —2— may be connected to the framing of the windshield or other part, in any suitable manner for operative relation of wiping member —14— with the desired portions of the shield.

Altho I have shown and described a specific construction as illustrative of an embodiment of my invention, I do not desire to limit myself to the same, as various changes in form and arrangement, and in the details of construction of the device may be made without departing from the invention as set forth in the appended claim.

I claim:

A windshield cleaner comprising two spaced motors, a cleaner arm pivoted between the motors and connections between the motors and the cleaner arm for alternately moving said cleaner arm in opposite directions about its pivot, and means for alternately energizing said motors in accordance with the movement of the cleaner arm.

In witness whereof I have hereunto set my hand this 21st day of February 1922.

HARRY G. SPARKS.